106. COMPOSITIONS, COATING OR PLASTIC.

98

Patented Feb. 6, 1923.

1,444,309

UNITED STATES PATENT OFFICE.

FABIO FERRARI, OF ROME, ITALY, ASSIGNOR TO THE COMPANY, BOMBRINI PARODI-DELFINO, OF ROME, ITALY.

MANUFACTURE OF CEMENT MIXTURES.

No Drawing.   Application filed August 23, 1920. Serial No. 405,417.

*To all whom it may concern:*

Be it known that I, FABIO FERRARI, a subject of the King of Italy, and residing at Rome, Italy, whose post address is Piazza S. S. Apostoli No. 18, have invented certain new and useful Improved Manufacture of Cement Mixtures, of which the following is a specification.

This invention relates to a binding or cement mixture for the preparation of agglomerates resisting the action of sea water or of sulphated water, characterized by a reduction to a fine powder of a cement free from binary calcium compounds of alumina or iron, and of a pozzuolana substance calculated on the basis of its absorbing power and of the lime which the cement can give off by hydration of its components, and of the sand with which it has to be subsequently mixed in order to be used in sea water or in surrounding places where sulphates abound.

After numerous experiments, the applicant has come to the conclusion that all strongly basic cement-containing mortars, when they are entirely or partly submerged, deteriorate in the course of time owing to the diffusion of the lime liberated by the hydration of the cements themselves. Although mortars containing "Aegir" cement (free from alumina) or a special cement such as that which forms the subject matter of my Patent No. 1,372,315 (in which the sesquioxides are converted into ternary silicates that are not attached by water and by saline solutions) are, in surroundings which abound in sulphates, absolutely stable as regards the action of these salts, they are not quite free from the drawbacks due to the action of the phenomenon indicated.

It is known that the lime contained in Portland cement is completely chemically combined to form insoluble compounds, by the addition of substances with strong pozzuolanic action.

This joint use of the two materials, cement and pozzuolana was long ago tried by W. Michaelis but the practical results have not till now answered the previous expectations of the author. As it was ascertained the said mixtures do not resist the disintegrating action of sea water or sulphate water owing to the presence of compounds of aluminate of calcium in the Portland cement; these aluminates uniting with the sulphates of the water in contact with the cement form disintegrating diffusive chemical combinations. To eliminate this drawback according to the present invention a new mixture is proposed in which instead of Portland cement, a special cement containing $Fe_2O_3$ and $Al_2O_3$ in the proportion of 1 to 1.563 (in Portland cement this proportion is about 0.5) absolutely free from aluminate compounds.

By means of the cement of the above mentioned type, investigated by the applicant, and of a pozzuolanic substance (pozzuolana, properly speaking, trass, basic slag etc.) reduced to the normal degrees of fineness or ordinary cements, a cement mixture is prepared which, on being mixed with silicious sand, gives agglomerates resisting in an absolute manner the action of sea water or of sulphated water generally, and absolutely impermeable.

The proportions of the two ingredients of the said cement mixture, are calculated on the basis of the determination; carried out in accordance with the ordinary methods (Vicat, Mayer, etc.), of the percentages of lime that the cement can give off by hydration, and of the lime which can be absorbed by contact respectively by the pozzuolanic substance above referred to, and by the silicous sand with which the said mixture has to be subsequently used.

For the above calculation also the sand has been considered which is but an ingredient of the conglomerate when it is employed the sand acting according to its porosity more or less like pozzuolana.

Supposing then:

$a$ CaO which can be given off by hydration of 100 parts by weight of the special cement.

$b$ CaO which can be fixed by 100 parts by weight of pozzuolanic substance.

$c$ CaO which can be fixed by 100 parts by weight of silicious sand.

$\frac{l}{r}$ proportion according to which will be used for the preparation of the conglomerates the mixture special cement-pozzuolana and silicious sand.

The percentage of special cement ($x$) and of pozzuolanic substance ($y$) in the mixtures to be prepared will be:

$$x = 100 - y$$

$$y = \frac{100(a - cr)}{a + b}.$$

The mixture described is obviously capable of general application: its use in sea work or works intended to remain in continuous contact with water rich in sulphates (and more particularly in movable works such as floating docks, keels of ships, etc.) is more particularly owing to the special characteristic features mentioned in the foregoing.

Having now particularly described and ascertained the nature of the said invention and in what manner the same is to be performed, I declare that what I claim is:

Cement mixture obtained by grinding pozzuolanic substances and a special cement containing $Fe_2O_3$ and $Al_2O_3$ free of aluminates and ferrites of calcium, the composition being calculated on the basis of the capacity of absorbing or of yielding CaO through hydration of its ingredients and of the sand to be employed for practical use, the resulting cementitious mixture being adapted for constructions exposed to sea water or to water rich of sulphates.

In testimony whereof I have hereunto signed my name in the presence of two witnesses.

FABIO FERRARI.

Witnesses:
 GINA CRINPANELLI,
 DUOLIO NARDENI.